Patented Aug. 9, 1938

2,126,648

UNITED STATES PATENT OFFICE 2,126,648

PROCESS OF PRODUCING HALOGENATED PHENOLS

William M. Lofton, Jr., Chicora, and Samuel G. Burroughs, Pittsburgh, Pa., assignors to Pennsylvania Coal Products Company, Petrolia, Pa., a corporation of Pennsylvania No Drawing. Application September 9, 1936, Serial No. 100,046

13 Claims. (Cl. 260—623)

The present invention relates to an improved method for the preparation of halogenated phenols, more particularly chlor phenols such as ortho and para chlor phenols from the corresponding dichlor benzenes by hydrolysis.

One of the objects of this inventioin is to greatly increase the yield of ortho and para chlor phenol over that prepared by methods known in the prior art.

Another object of this invention is to enable the reaction for the production of chlor phenols to take place at lower pressures and temperatures without diminishing the yield.

Still another object of the invention is to greatly accelerate the speed of the aforementioned hydrolysis and to provide a novel catalyst for accelerating the reaction.

Many methods for the hydrolysis of dichlor benzenes to the corresponding chlor phenols are known in the art. The most practical of these accomplishes the hydrolysis by heating dichlor benzenes with large excesses of alkali metal hydroxide, dissolved in or mixed with methyl alcohol at temperatures of 190° C. to 220° C. in pressure vessels. The use of a catalyst for this reaction, namely copper, is also known. The known methods, however, do not produce high yields of chlor phenols because decomposition takes place at the high temperatures and pressures necessarily used and even though these high pressures and temperatures are used, the hydrolysis proceeds slowly and an incomplete conversion results even after long periods of reaction.

It is also known in the prior art that when ortho dichlor benzene is hydrolyzed with sodium hydroxide or other alkali or alkaline earth hydroxides in the presence of water and a copper oxide catalyst at temperatures in excess of 250° C. and corresponding high pressures that ortho dihydroxy benzene results. It has further been stated in this connection that if an organic liquid such as ethyl or methyl alcohol is present these tend to cause the formation of ortho chlor phenol.

The surprising discovery has been made that high yields of ortho and para chlor phenols may be effected at comparatively low temperatures, i. e., at temperatures between 150° C. and 190° C. and corresponding pressures by the addition of an amount of water to the hydrolyzing reagents. In addition, it has been found that the presence in the reaction mixture of a suitable solvent such as ethyl and/or methyl alcohol, a copper catalyst, an alkali metal and an alkaline earth metal compound to be beneficial and necessary if economically feasible yields are to be obtained.

It is believed that the reason for the improvement noted in hydrolyzing dichlor benzenes to chlor phenols when the alkali metal hydroxide used is dissolved for example in a mixture of methanol and water, is because a more complete solution of the alkali metal hydroxide is thus obtained; while at the same time, the solubility of the dichlor benzenes is sufficient for reaction. It is not desired to be limited to this explanation or theory, however, and it may well be true that other theories may serve to explain this phenomenon. The addition of water to the hydrolyzing medium may also be beneficial due to the increased solubility of the copper catalyst employed.

It has been found that the internal pressure generated during the course of the hydrolysis was greatly diminished by the addition of water to the hydrolyzing medium. Thus when the amount of water used was equal to 25% of the methyl alcohol used, the pressure during the reaction was 25-50% less than when methyl alcohol alone was used.

As a catalyst, any suitable hydrolysis catalyst may be used. Copper salts have been found especially suitable, or any copper compound which will precipitate copper oxide or hydroxide or metallic copper upon reaction with an alkali metal hydroxide and it will be understood that when the term "copper catalyst" is used, compounds containing the copper ion such as copper sulfate, are thereby also referred to.

The amount of the alkaline earth metal oxide or hydroxide or salt which we found to be beneficial in the hydrolyzing process was an amount greater than or equivalent to the amount of copper catalyst used. The reason for the improvement obtained by the addition of the alkaline earth metal compound is believed to be due to the fact that the copper catalyst is held in a more active condition, thus facilitating the reaction under severe temperature conditions. The result of the use of alkaline earth metal oxides or hydroxides or salts is to obtain better yields at lower temperatures and since the temperature is kept lower, less decomposition of the dichlor benzenes to form undesirable products will take place. Where such compounds were not present the yield did not exceed 33% under any conditions.

In carrying out the method in a practical manner, it has been found advisable but not necessary, to proceed according to the following examples, in which the proportions are given in terms of weight.

Example 1

A mixture was made up of:

| | Parts |
|---|---|
| Ortho dichlor benzene | 1840 |
| Methyl alcohol | 4293 |
| Water | 1073 |
| Copper sulfate | 60 |
| Calcium hydroxide | 600 |
| Sodium hydroxide | 2000 |

These materials may be charged into the cast iron, steel, or other suitable pressure vessel, either separately, or they may be added after being mixed in a separate vessel. The vessel is then closed and heated rapidly to an inside temperature between 150° C. and 190° C. for a period of 12 to 36 hours. During the course of the heating process, the contents of the pressure vessel are preferably kept well agitated by suitable means. The vessel is then allowed to cool, and the contents containing the chlor phenol in the form of a salt, are removed. Preferably all or part of the methyl alcohol is removed by distillation, the distillation residue acidified by means of hydrochloric or sulfuric acid, or other acidic substances, and subsequently the chlor phenol removed by extraction or steam distillation in the known manner. By proceeding in this manner, a yield of ortho chlor phenol of high purity, corresponding to 80% of the theoretical amount, is obtained. The greater part of the methyl alcohol used is recovered.

Example 2

| | Parts |
|---|---|
| Ortho dichlor benzene | 1840 |
| Methyl alcohol | 4293 |
| Water | 1073 |
| Copper sulfate | 60 |
| Calcium hydroxide | 600 |
| Sodium hydroxide | 3880 |

The above ingredients were charged into an iron pressure vessel as in Example 1, and heated and treated as in Example 1, to produce and separate ortho chlor phenol, the yield of ortho chlor phenol is 90% of the theoretical quantity.

Example 3

| | Parts |
|---|---|
| Ortho dichlor benzene | 1840 |
| Methyl alcohol | 2050 |
| Water | 4316 |
| Copper sulfate | 60 |
| Calcium hydroxide | 600 |
| Soduim hydroxide | 2000 |

These materials are treated as in Example 1, and the yield of ortho chlor phenol is 30% of theory.

The para chlor phenol may be prepared in a manner analogous to the examples given above. The same procedure, using the same compounds with the exception that para dichlor benzene is substituted for the ortho dichlor benzene, results also in good yields of para chlor phenol.

Example 4

| | Parts |
|---|---|
| Crude ortho dichlor benzene, containing approximately 10% of para dichlor benzene | 1840 |
| Methyl alcohol | 4293 |
| Water | 1073 |
| Copper sulfate | 60 |
| Calcium hydroxide | 600 |
| Soduim hydroxide | 2000 |

These materials are heated in the pressure vessels as in Example 1. When the reaction is finished, the product is treated as in Example 1, to remove methyl alcohol, acidified, and the chlor phenols separated. The total yield of chlor phenols is 85% of the amount theoretically possible. The crude mixed chlor phenols are separated by fractional distillation and are found to be composed of:

| | Per cent |
|---|---|
| Ortho chlor phenol | 85 |
| Para chlor phenol | 12 |
| High boiling impurities | 3 |

The reaction as carried out by the procedure outlined above takes place in the liquid phase due to the temperature and pressures specified and the proportions of ingredients used. The presence of the organic solvent, i. e., alcohol, is beneficial due to its presence in the reaction medium as a liquid solvent. Since this is true the temperature employed to effect reaction is always lower than the critical temperature of the solvent used, i. e., the temperature at which the solvent ceases to be a liquid and exists in the vapor phase as a dissolved gas irrespective of the pressure. For methyl alcohol this critical temperature is in the neighborhood of 240° C. and for ethyl alcohol, 243° C. It is apparent therefore that if the alcohol solvent is to be maintained in the liquid phase, that these critical temperatures cannot be exceeded. In actual practice, the preferred temperature range is much lower than this, preferably always below 190° C., in order to prevent side reactions which tend to cut down the yield and to prevent decomposition of the alcohols into ethers.

One of the features of the preferred form of the present invention is to carry out the reaction at a temperature below the critical temperature of the solvent used. It is evident that this principle may be broadly applied to various solvents and therefore, the present invention is not limited to the use of specific solvents, such as the alcohols, and more specifically, methyl and ethyl alcohol. Any solvent which will function in accordance with the present invention may be used.

The presence of water alone was not found to be as effective as the water and alcohol mixture. When the ratio of water to alcohol is as high as 2 to 1 or higher, the reaction was found to proceed very slowly and the yields comparatively low as shown by Example 3. It has been found that when water alone was used no hydrolysis of the dihalogenated benzene occurs at temperatures up to 220° C. While some of the prior art, as mentioned earlier in this application, discloses the hydrolysis of dihalogenated benzene at 250° C. or higher, it is apparent that this temperature is necessary because the use of any considerable quantity of alcohol is not contemplated. It is evident further that in this reaction any alcohol present is in the gaseous phase.

It has never been found necessary to utilize temperatures in excess of 190° C. to obtain a good yield of the halogenated phenol. At higher temperatures side reactions occur which result in the prevention of a maximum yield. By proceeding in accordance with the conditions as set forth, side reactions are reduced to a minimum and high yields of substantially pure halogenated phenols obtained. The presence of organic liquids, particularly the alcohols in the reaction mixture, does not act to produce, for example, ortho dihydroxy benzene. It is well known also that alcohols heated under conditions of high pressures and/or temperatures in the presence of alkalis are dehydrated to produce ethers.

Under the temperature and pressure conditions employed according to the invention, such alcohol losses have been reduced to a minimum. As much as 86% of the alcohol used was recovered.

While the specific examples disclose the use of sodium hydroxide, it is not necessary to be so limited since other alkali metal hydroxides and/or compounds such as potassium hydroxide, may be used. The amount thereof can also be varied considerably depending on the temperature and time allowed for the reaction to go to completion.

While the specific examples disclose the use of calcium hydroxide, equivalent hydroxides or salts or oxides of other alkaline earth metals such as barium or strontium may be used. Likewise in place of methyl alcohol, other alcohols such as ethyl alcohol have been found operable. Better yields were obtained by the use of methyl alcohol, however, and its use is preferred.

It is, of course, possible to vary the proportions of the ingredients in a limited manner without greatly interfering with the reaction. In accordance with the preferred form of our invention, however, it has been found that chlor phenols may be prepared by hydrolyzing compounds of the group consisting of ortho dichlor benzene, para dichlor benzene, and a mixture of the same at temperatures between 150° C. and 190° C., with a hydrolyzing agent comprising the reaction mixture of water, a suitable alcohol, a copper catalyst, an alkali metal compound, and an alkaline earth compound. The alkali metal compound is preferably present in an amount varying between 3 to 8 molecular equivalents of the dichlor benzene. The alkaline earth compound is preferably present in an amount not exceeding 2 molecular equivalents per mol. of dichlor benzene. The amount of the alcohol-water mixture is preferably equal to approximately 2 to 6 times the amount of the chlor benzene compound, and the water content of the alcohol-water mixture is preferably from 10% to 50% of the mixture.

While the above examples are illustrative of the preferred form of our procedure, it is obvious that a certain amount of change may be made in the proportions of ingredients used or certain variations in the procedure without departing from the spirit or scope of the invention.

Although the method of preparing halogenated phenols has been discussed in detail as applied to chlor phenols and particularly dichlor benzene, the method is equally applicable to the hydrolysis of di-bromo benzenes and di-iodo benzenes to the corresponding halogenated phenols.

In general, a hydroxy halogen compound may be prepared by hydrolyzing a di-halogen substitution product of benzene or mixtures thereof. This may be accomplished by mixing the benzene compound, or mixtures of compounds, with a hydrolyzing agent comprising the reaction mixture of aqueous material, preferably water, and a solvent for the compound being treated, an alkali metal compound, an alkaline earth metal compound, and a hydrolysis catalyst. The water and solvent content of the hydrolyzing agent should be sufficient to insure the solution therein of the alkali metal compound and the di-halogen benzene compound, and the temperature at which the hydrolysis is carried out should be such that the solvent should remain substantially in the liquid phase.

The present application is a continuation-in part of co-pending application Serial No. 747,924, filed October 11, 1934.

What is claimed is:—

1. The process of preparing halogenated phenols comprising hydrolyzing compounds of the group consisting of the dihalogen substitution products of benzene and mixtures thereof with a hydrolyzing agent consisting of the reaction mixture of water, methyl alcohol, an alkali metal hydroxide, an alkaline earth metal hydroxide and a copper catalyst, the water and alcohol content of the said hydrolyzing agent being sufficient to insure the solution therein of the alkali metal compound and the dihalogen benzene compound, the temperature of hydrolysis being such that substantially all the methyl alcohol shall remain in the liquid phase.

2. The process of preparing chlor phenols comprising hydrolyzing compounds of the group consisting of ortho dichlor benzene, para dichlor benzene and a mixture of the two with a mixture of water, methyl alcohol, 3 to 8 molecular equivalents of an alkali metal hydroxide per mol. of the said dichlor benzene compound, a copper sulfate decomposable in the presence of alkali metal hydroxide and alkaline earth metal hydroxide to produce in situ a copper coating, an alkali earth metal hydroxide in an amount equal to at least the amount of copper sulfate used and not exceeding 2 molecular equivalents per mol. of the dichlor benzene compound, at a temperature such that the methyl alcohol remains in the liquid phase.

3. The process of preparing halogenated phenols comprising hydrolyzing a compound of the group consisting of ortho dihalogen benzene, para dihalogen benzene, and a mixture of the two with a hydrolyzing agent consisting of a reaction mixture of water, a solvent for the benzene compound, an alkali metal hydroxide, an alkaline earth metal hydroxide and a copper catalyst, the water and solvent content of the said hydrolyzing agent being sufficient to insure the solution therein of the alkali metal compound and the dihalogen benzene compound, and the temperature of hydrolysis being below the critical temperature of the solvent.

4. The process of preparing halogenated phenols comprising hydrolyzing a compound of the group consisting of ortho dihalogen benzene, para dihalogen benzene, and a mixture of the two with a hydrolyzing agent consisting of a reaction mixture of water, an alcohol solvent for the benzene compound, an alkali metal hydroxide, an alkaline earth metal hydroxide and a copper catalyst, the water and alcohol content of the said hydrolyzing agent being sufficient to insure the solution therein of the alkali metal compound and the dihalogen benzene compound, and the temperature of hydrolysis being below the critical temperature of the alcohol.

5. The process of preparing chlor phenols comprising hydrolyzing compounds of the group consisting of ortho dichlor benzene, para dichlor benzene and a mixture of the two at a temperature between 150° C. and 190° C. with a hydrolyzing agent consisting of a mixture of water and an alcohol selected from the group consisting of ethyl and methyl alcohol, an alkali metal hydroxide, an alkaline earth metal hydroxide and a copper catalyst, the water content of said alcohol-water mixture being 10 to 50% of the total quantity of the mixture.

6. The process of preparing chlor phenols comprising hydrolyzing compounds of the group consisting of ortho dichlor benzene, para dichlor benzene, and a mixture of the two, with a hydrolyzing agent consisting of a mixture of water and an alcohol, selected from the group consisting of ethyl and methyl alcohol, an alkali metal hydroxide, an alkaline earth metal hydroxide and a copper catalyst, the water and alcohol mixture being 2 to 6 times the amount of the dichlor benzene compound and the water content of the water-alcohol mixture being 10 to 50% of the mixture, at a temperature below the critical temperature of the alcohol used.

7. The process of preparing chlor phenols comprising hydrolyzing a compound of the group consisting of ortho dichlor benzene, para dichlor benzene and a mixture of the two with a hydrolyzing agent consisting of a reaction mixture of water, methyl alcohol, an alkali metal hydroxide, an alkaline earth metal hydroxide and a copper catalyst, the water and alcohol content of the said hydrolyzing agent being 2 to 6 times the amount of the dichlor benzene compound and the temperature of hydrolysis being such that substantially all the methyl alcohol shall remain in the liquid phase.

8. The process of preparing chlor phenols comprising hydrolyzing a compound of the group consisting of ortho dichlor benzene, para dichlor benzene and a mixture of the two with a hydrolyzing agent consisting of a reaction mixture of water, methyl alcohol, sodium hydroxide, calcium hydroxide and a copper catalyst, the water and alcohol content of the said hydrolyzing agent being sufficient to insure the solution therein of the sodium hydroxide and the dichlor benzene compound and the temperature of hydrolysis being such that substantially all the methyl alcohol shall remain in the liquid phase.

9. The process of preparing para chlor phenol comprising hydrolyzing para dichlor benzene with a hydrolyzing agent consisting of a reaction mixture of water, methyl alcohol, sodium hydroxide, calcium hydroxide and a copper catalyst, the water and alcohol content of the said hydrolyzing agent being 2 to 6 times the amount of the para dischlor benzene and the water content of the said water-alcohol mixture being 10 to 50% of the water-alcohol mixture and the temperature of hydrolysis being such that substantially all the methyl alcohol shall remain in the liquid phase and treating the resultant product to recover the methyl alcohol and para chlor phenol therefrom.

10. The process of preparing chlor phenols comprising hydrolyzing compounds of the group consisting of ortho dichlor benzene, para dichlor benzene, and a mixture of the two at a temperature below 240° C. with a hydrolyzing agent consisting of a mixture of water, methyl alcohol, an alkali metal hydroxide, an alkaline earth metal hydroxide and a copper catalyst, these constituents of the hydrolyzing agent being present in sufficient quantity to insure substantially complete hydrolysis of the dichlor benzene compounds to the corresponding chlor phenols.

11. The process of preparing chlor phenols comprising hydrolyzing compounds of the group consisting of ortho-dichlor benzene, para dichlor benzene, and a mixture of the two, with a mixture of water, methyl alcohol, 3 to 8 molecular equivalents of an alkali metal hydroxide per mol. of the said dichlor benzene compound, a copper catalyst, an alkaline earth metal hydroxide in an amount equal to at least the amount of copper sulphate used and not exceeding 2 molecular equivalents per mol. of the dichlor benzene compound at a temperature such that the methyl alcohol remains in the liquid phase.

12. The process of preparing chlor phenols comprising hydrolyzing compounds of the group consisting of ortho dichlor benzene, para dichlor benzene, and a mixture of the two, with a mixture of water, an alcohol solvent for the benzene compound, 3 to 8 molecular equivalents of an alkali metal hydroxide per mol. of the said dichlor benzene compound, a copper catalyst, an alkaline earth metal hydroxide in an amount equal to at least the amount of copper sulphate used and not exceeding 2 molecular equivalents per mol. of the dichlor benzene compound at a temperature such that the alcohol solvent remains in the liquid phase.

13. The process of preparing halogenated phenols comprising hydrolyzing a compound of the group consisting of ortho dihalogenated benzene, para dihalogenated benzene and a mixture of the two, with a hydrolyzing agent consisting of a reaction mixture of water, methyl alcohol, 3 to 8 molecular equivalents of an alkali metal hydroxide per mol. of the dihalogenated benzene, a copper catalyst, an alkaline earth metal hydroxide in an amount equal to at least the amount of copper sulphate used and not exceeding 2 molecular equivalents per mol. of the dihalogenated benzene compound, the water and alcohol content of the said hydrolyzing agent being sufficient to insure the solution therein of the alkali metal compound and the dihalogenated benzene compound, and the temperature of hydrolysis being below the critical temperature of the methyl alcohol.

WILLIAM M. LOFTON, Jr.
SAMUEL G. BURROUGHS.